United States Patent [19]
Baird et al.

[11] Patent Number: 5,848,264
[45] Date of Patent: Dec. 8, 1998

[54] DEBUG AND VIDEO QUEUE FOR MULTI-PROCESSOR CHIP

[75] Inventors: Brian R. Baird, Pleasanton; David E. Richter; Shalesh Thusoo, both of Milpitas; David M. Stark; James S. Blomgren, both of San Jose, all of Calif.

[73] Assignee: S3 Incorporated, Santa Clara, Calif.

[21] Appl. No.: 740,248

[22] Filed: Oct. 25, 1996

[51] Int. Cl.[6] .................................................. G06F 9/455
[52] U.S. Cl. ............................................................ 395/500
[58] Field of Search .................................. 395/385, 500, 395/527

[56] References Cited

U.S. PATENT DOCUMENTS

| | | | |
|---|---|---|---|
| 5,313,618 | 5/1994 | Pawloski et al. ......................... | 395/500 |
| 5,321,828 | 6/1994 | Phillips et al. ........................... | 395/500 |
| 5,329,273 | 7/1994 | Patton ...................................... | 340/517 |
| 5,357,626 | 10/1994 | Johnson et al. .......................... | 395/500 |
| 5,392,420 | 2/1995 | Balmer et al. ............................ | 395/500 |
| 5,410,547 | 4/1995 | Drain ....................................... | 371/22.4 |
| 5,479,634 | 12/1995 | Takita . | |
| 5,486,876 | 1/1996 | Lew et al. ................................ | 348/719 |
| 5,493,315 | 2/1996 | Atchley .................................... | 345/200 |
| 5,493,637 | 2/1996 | Martin ...................................... | 395/131 |
| 5,546,562 | 8/1996 | Patel ......................................... | 395/500 |
| 5,564,041 | 10/1996 | Matsui et al. ............................ | 395/500 |
| 5,594,890 | 1/1997 | Yamuaura et al. ....................... | 395/500 |
| 5,630,102 | 5/1997 | Johnson et al. .......................... | 395/500 |
| 5,680,583 | 10/1997 | Kuijsten ................................... | 395/500 |
| 7,510,934 | 1/1998 | Bona et al. .......................... | 395/183.06 |

*Primary Examiner*—Kevin J. Teska
*Assistant Examiner*—Ayni Mohamed
*Attorney, Agent, or Firm*—Stuart T. Auvinen

[57] ABSTRACT

A microprocessor die contains several processor cores and a shared cache. Trigger conditions for one or more of the processor cores are programmed into debug registers. When a trigger is detected, a trace record is generated and loaded into a debug queue on the microprocessor die. Several trace records from different processor cores can be rapidly generated and loaded into the debug queue. The external interface cannot transfer these trace records to an external in-circuit emulator (ICE) at the rate generated. The debug queue transfers trace records to the external ICE using a dedicated bus to the ICE so that bandwidth is not taken from the memory bus. The memory bus is not slowed for debugging, providing a more realistic debugging session. The debug buffer is also used as a video FIFO for buffering pixels for display on a monitor. The dedicated bus is connected to an external DAC rather than to the external ICE when debugging is not being performed.

20 Claims, 7 Drawing Sheets

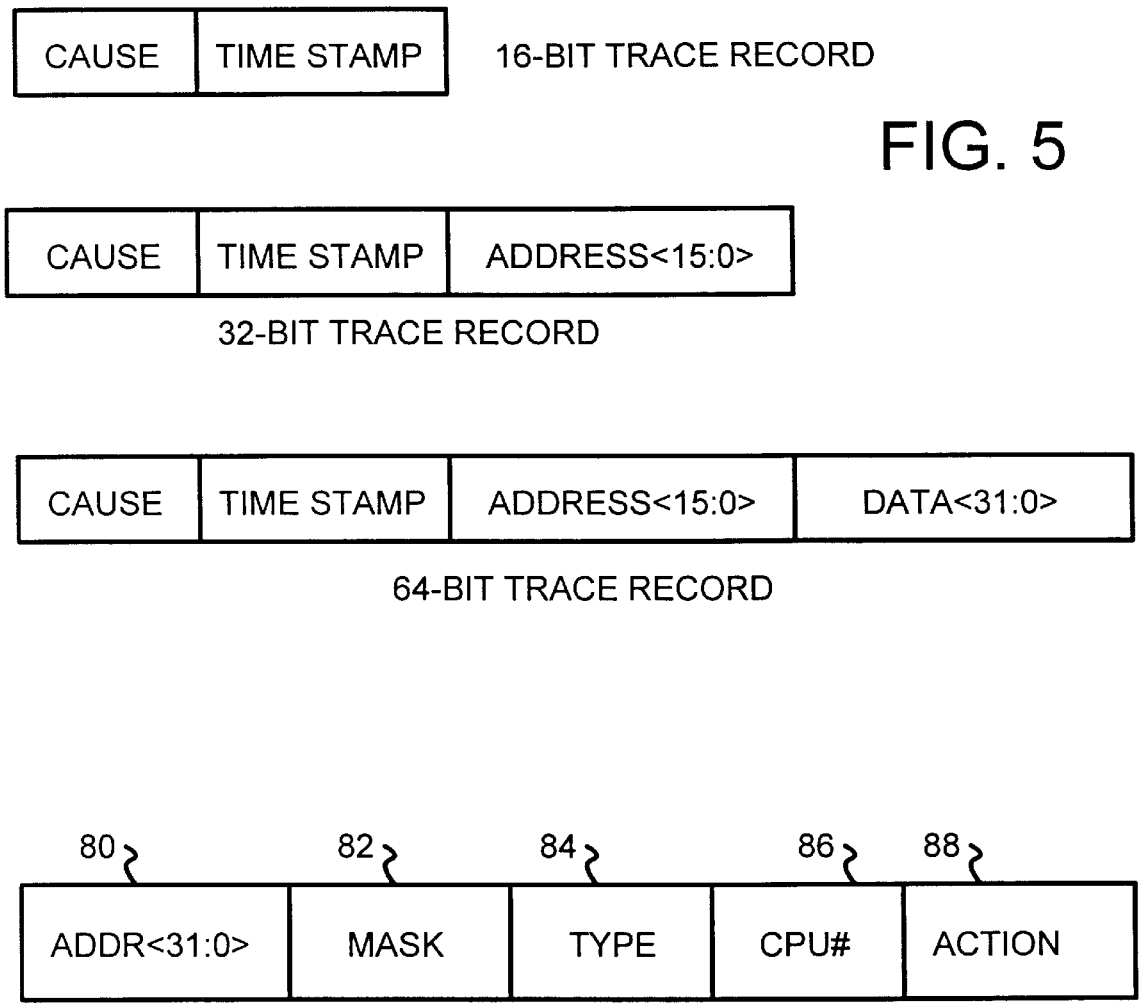

DEBUG AND VIDEO QUEUE FOR MULTI-PROCESSOR CHIP

BACKGROUND OF THE INVENTION—FIELD OF THE INVENTION

This invention relates to computer systems, and more particularly to trace capture for debugging and a cacheable video architecture using debugging hardware.

BACKGROUND OF THE INVENTION—DESCRIPTION OF THE RELATED ART

Complex computer systems and programs rarely work exactly as designed. During the development of a new computer system, unexpected errors or bugs may be discovered by thorough testing and exhaustive execution of a variety of programs and applications. The source or cause of an error is often not apparent from the error itself; many times an error manifests itself by locking the target system for no apparent reason. Thus tracking down the source of the error is problematic.

An existing host computer system is often used to observe activity of the target system. A trace of this activity is made just before the error occurs. This host system and its interface is known as an in-circuit emulator (ICE). Often the ICE is a simple personal computer (PC) connected to an emulator interface. The emulator interface is connected to a small circuit card that is plugged into the target system being developed. The small circuit card is inserted between the micro-processor and the motherboard. Phillips et al. describe an ICE in U.S. Pat. No. 5,321,828, which is assigned to Step Engineering of Sunnyvale Calif.

A trigger condition, such as an access of a specific address, is programmed into the host system. Addresses from the microprocessor are continuously sent from the small circuit card to the emulator interface and compared to the trigger address. Once an address match occurs, the emulator captures bus activity that occurs after the trigger, or saves bus activity that occurred just before the trigger or some programmable delay relative to the trigger.

A particular problem occurs when the microprocessor chip contains an internal cache. The internal cache hides the activity of the microprocessor core by buffering and delaying memory accesses. The microprocessor core may write to the trigger address in the internal cache many cycles before the internal cache writes the data at the trigger address out to the external pins of the chip. Thus the emulator may not trigger until many cycles after the microprocessor reaches the trigger address.

This problem has been solved in a variety of ways. For example, Johnson and Witt in U.S. Pat. No. 5,357,626, assigned to Advanced Micro Devices of Sunnyvale Calif., use a second microprocessor chip which operates in a master-slave mode to a first microprocessor chip. The second microprocessor chip duplicates the instructions executed by the first (master) chip. The second (slave) microprocessor chip has special pins to transmit internal execution state to the ICE. Thus a second, specially-modified microprocessor chip is used to make internal state information available to the ICE. Additional I/O pins on the chip are used to aid in debugging.

FIG. 1 is a timing diagram of a prior-art in-circuit emulator debugging a microprocessor. Execution of a test program in the microprocessor core generates internal trigger events, EVENT_1, EVENT_2, EVENT_3, which occur at different times depending on the programming of trigger conditions in debug registers. These internal trigger events pass information to the I/O pins of the chip, such as the trigger address, data, and possibly internal state information. Bus 14 includes the address, data, and status pins of the chip which are connected to ICE 12. Special test pins which pass internal information to ICE 12 are also included in bus 14.

All addresses generated by the processor, or by a bus-interface unit for the processor, are transmitted over bus 14 to ICE 12. Most of these addresses are not addresses near the trigger address which are stored by ICE 12 as the trace. Thus most of the addresses transmitted to ICE 12 over bus 14 are discarded by ICE 12. Thus much of the bandwidth on bus 14 to ICE 12 is wasted bandwidth.

While the debugging apparatus of FIG. 1 is adequate for slower chips with a single microprocessor core, when faster or multiple processor cores or other independent subsystems exist on a chip, the number of events occurring can increase beyond the bandwidth of the pins of the chip. FIG. 2 shows a timing diagram for a chip having multiple processor cores connected to an ICE which is overwhelmed by debug events. The three processor cores, CPU-0, CPU-1, CPU-2, do not connect directly to the I/O pins of the chip since this requires too many pins. Instead, these processor cores are connected to a shared internal cache and then to a bus-interface unit which sends requests outside the chip. The first processor core generates trigger events EVENT_1, EVENT_2, EVENT_3, while the second processor core generates trigger events EVENT_4 and EVENT_5. The third processor core generates trigger events EVENT_6, EVENT_7.

Since the processor cores are capable of simultaneously executing independent programs, these events may be generated at approximately the same time. There is only one interface to the pins of the chip and to external ICE 12. Therefore only one event may be transmitted to ICE 12 at a time. When multiple events occur from different processor cores, such as events EVENT_4 and EVENT_2, both events cannot be transmitted over bus 14 to ICE 12.

The multiple processor cores increase the possible debug bandwidth since multiple programs may be executing at the same time. Another problem is that these processor cores often are executing at a higher clock rate than the external interface of bus 14 to ICE 12. Thus while the internal trigger events are generated in a short amount of time using the faster internal clock, these events cannot be transmitted over external bus 14 to ICE 12 as quickly as they are generated.

The interface for transmitting debug event information from the microprocessor chip to ICE 12 can be expanded by increasing the number of pins on bus 14. However, this is very expensive and not practical, especially when the amount of debug information doubles or triples as when multiple processor cores are simultaneously executing test programs. The chip cannot generate more debug information than can be transmitted out of the chip in any given cycle or some of the generated debug information will be lost.

All but one of the multiple processor cores could be disabled from generating trigger events, but this severely limits the ability to debug realistic situations when multiple programs execute on the multi-processor chip. While the data and address busses of the bus-interface unit and the shared cache may be used to transmit the trigger event information to the external ICE, it is more desirable to use a separate interface for debug events so that the existing data and address busses may continue to be used for program execution and accessing external memory such as DRAM. Debugging can change the program's behavior when the external bus must be halted to transfer debug information off the chip.

What is desired is a debugging system for multi-processor chips. It is desired to execute several test programs simultaneously on a microprocessor chip which has several independent processor cores and to generate internal trigger events from multiple processor cores. It is desired to transmit these multiple trigger events to an external ICE using a small interface having relatively few I/O pins. It is desirable to use a debug interface which is separate from the DRAM interface. It is also desired to have the majority of the hardware for the debug interface to be useful during normal processing. It is desired to combine the debug interface with a video display interface.

SUMMARY OF THE INVENTION

A microprocessor die is adapted for high-speed debugging. I/O pins on the die make electrical connections between circuitry on the microprocessor die and external circuitry. The I/O pins include memory interface pins for connection to an external memory and debug interface pins for connection to an external in-circuit emulator (ICE). A processor core fetches and executes instructions. A cache is coupled to the processor core. It supplies instructions and operands to the processor core. A bus-interface unit is coupled to the cache and to the memory interface pins. It accesses the external memory when an instruction or an operand requested by the processor core is not present in the cache.

A debug queue is coupled to the processor core. The debug queue stores debug trace records generated by execution of traced instructions by the processor core. A debug interface is coupled to the debug queue and to the debug interface pins on the microprocessor die. It transfers debug trace records previously written to the debug queue to the external ICE. The external ICE displays the debug trace records. The debug interface pins are different pins than the memory interface pins.

Thus the debug interface is a separate interface from the memory interface. The debug queue buffers debug trace records to the external ICE using the debug interface pins. The bandwidth of the memory interface pins is not used for transferring debug trace records, allowing high-speed debugging.

In further aspects the debug queue is a FIFO memory. The debug trace records are written to the debug queue at a first rate of a processor clock but read from the debug queue to the debug interface pins at a second rate of an external clock. The second rate of the external clock is a lower rate than the first rate of the processor clock. Transfer of debug trace records to the external ICE is delayed by several external clock cycles when the debug queue contains other debug trace records.

In still further aspects the debug trace records stored in the debug queue include a time-stamp field which indicates a temporal location of when the debug trace record was generated by the processor core. An identifier field indicates a debug event which caused the debug trace record to be generated. Thus the time-stamp field in the debug trace record is stored in the debug queue and transferred to the external ICE to indicate when the debug trace record was generated by the processor core.

In further aspects a time-stamp counter has a limited modulus. The time-stamp counter reaches the limited modulus in less than a minute when each pulse of a processor clock increments the time-stamp counter. Thus the debug trace records include a time stamp generated from a limited-modulus counter.

In further aspects of the invention a rollover trace record is written to the debug queue when the time-stamp counter reaches the limited modulus. The time-stamp counter is incremented after every X pulses of the processor clock, where X is a clock divisor programmed into a clock divisor register. Thus the time-stamp counter is incremented at a programmable rate.

In other aspects the time-stamp counter is cleared after each debug trace record is written to the debug queue. Thus the time-stamp field indicates an amount of time since the previous debug trace record was written to the debug queue.

In other aspects a second processor core fetches and executes general-purpose instructions. The second processor core is coupled to the cache and coupled to the debug queue. The debug queue is further coupled to the second processor core. The debug queue stores debug trace records generated by execution of traced instructions by the processor core and by the second processor core. The processor core and the second processor core are not directly connected to address and data I/O pins on the microprocessor die. The processor core and the second processor core indirectly access the external memory through the cache and the bus-interface unit. Thus multi-processor debugging is accomplished by the debug queue buffering debug trace records generated from both the processor core and the second processor core. The processor core and the second processor core execute independent programs.

BRIEF DESCRIPTION OF THE DRAWINGS

FIG. 5 is a diagram of trace records stored in the debug queue.

FIG. 6 is a diagram of a debug trigger register for a multi-processor chip.

DETAILED DESCRIPTION

The present invention relates to an improvement in microprocessor debug and video architecture. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

A debug queue is added on the microprocessor chip to buffer debug information being sent to the external ICE.

This queue allows for debug trace information to be generated at a higher rate than can be sent off-chip, as long as the queue does not fill up. When a trigger is reached internally, the debug trace information is rapidly sent to the debug queue and then transmitted to the external ICE at a lower rate. The debug queue allows for a short period of time when multiple debug events are generating trace information. The size or depth of the queue determines how many simultaneous triggers can occur, and how much trace information can be generated and stored without loss.

Buffering debug trace information is not performed by the prior-art microprocessors. The trace information is generally received in real-time by prior-art ICE's. Buffering trace information for a prior-art ICE would cause the time information to be lost.

Figure 1:
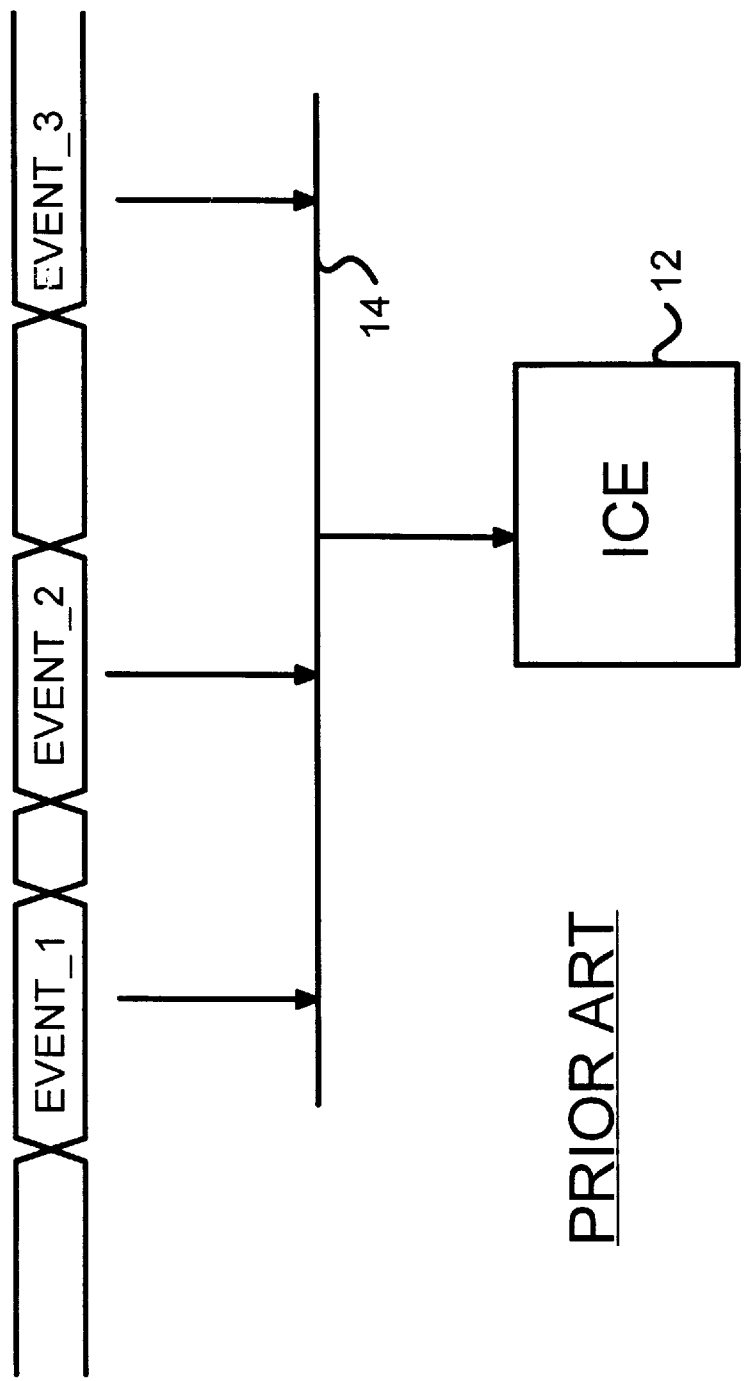
FIG. 1 is a timing diagram of a prior-art in-circuit emulator debugging a microprocessor.
Figure 2:
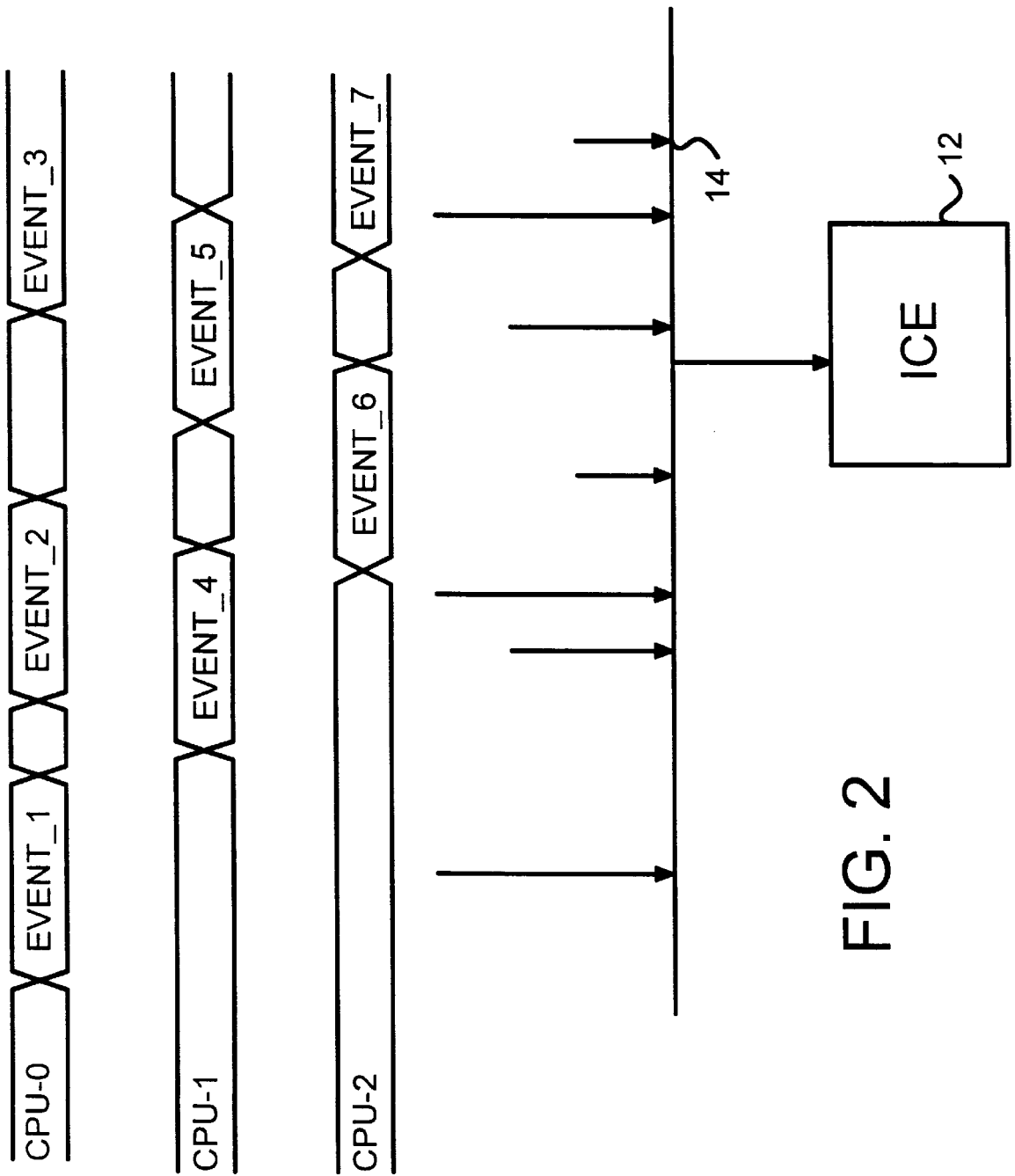
FIG. 2 shows a timing diagram for a chip having multiple processor cores connected to an ICE which is overwhelmed by debug events.
Figure 3:
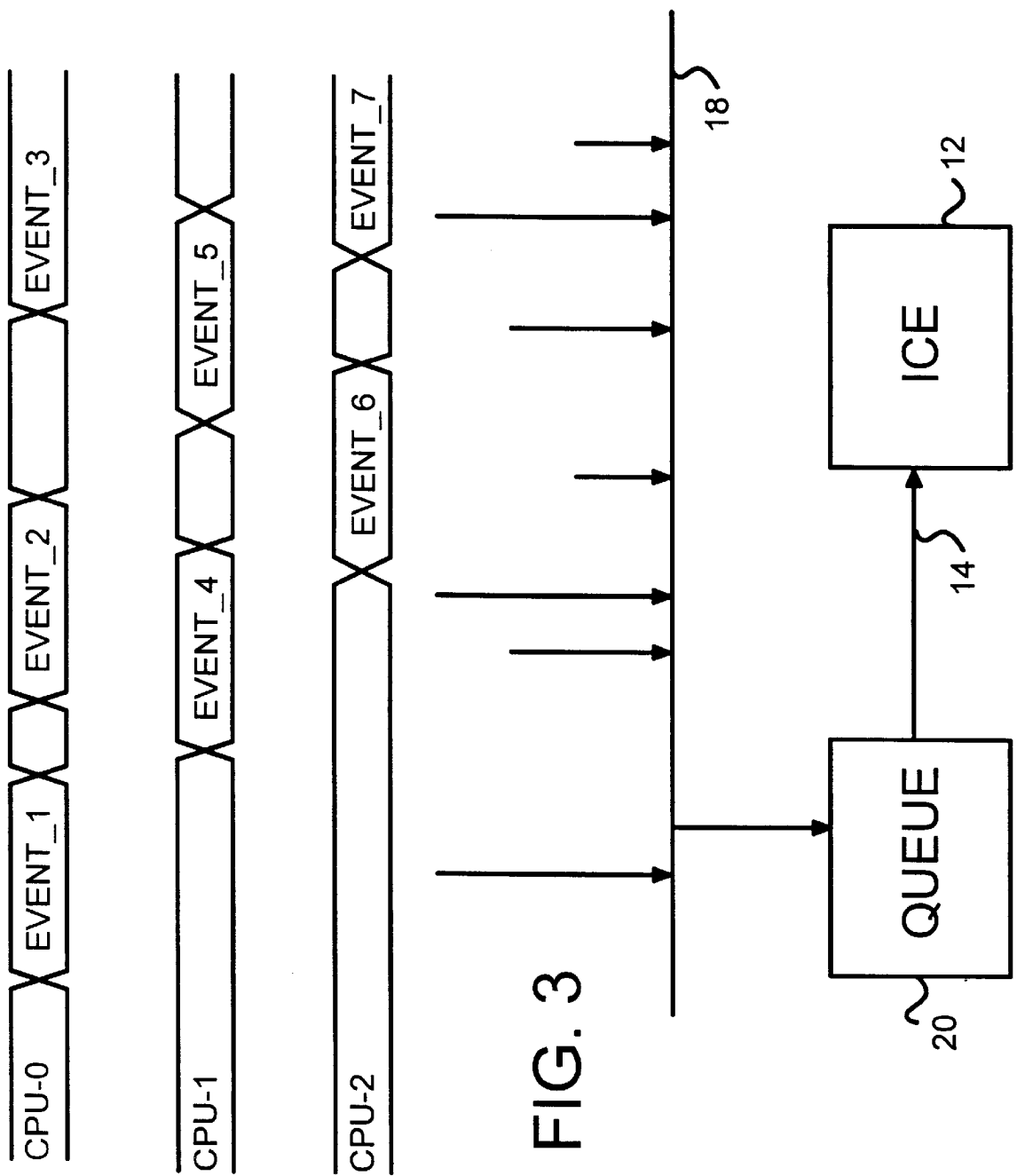
FIG. 3 is a timing diagram of a multi-processor chip with a debug queue for buffering debug trace information to an external in-circuit emulator (ICE).

FIG. 3 is a timing diagram of a multi-processor chip with a debug queue for buffering debug trace information to an external in-circuit emulator (ICE). The three processor cores, CPU-0, CPU-1, CPU-2, do not connect directly to the bonding pads or I/O pins of the chip since this requires too many pins. Instead, these processor cores are connected to a shared internal cache and then to a bus-interface unit which sends requests outside the chip. The first processor core generates trigger events EVENT_1, EVENT_2, EVENT_3, while the second processor core generates trigger events EVENT_4 and EVENT_5. The third processor core generates trigger events EVENT_6, EVENT_7.

Internal bus 18 receives trace information from the three CPU cores, such as address, status, and possibly data. Internal bus 18 receives this trace information and loads it into debug queue 20. Debug queue 20 temporarily stores debug trace information and then transmits it on external bus 14 through the I/O pins of the microprocessor chip to ICE 12. Debug queue 20 is a standard first-in-first-out (FIFO) buffer, although the read and write ports can be of different widths.

Internal bus 18 can be made wider than external bus 14 since I/O pins of the chip are not needed for internal connections from the CPU cores to debug queue 20. Internal bus 18 can operate at a higher speed than external bus 14 since internal connections have lower capacitance and delays than external connections. Debug trace information from the CPU cores is sent over internal bus 18 at a high rate to debug queue 20, and then transmitted at a lower rate from debug queue 20 over external bus 14 to ICE 12.

Buffering Allows Slower External Bus to ICE

Figure 4:
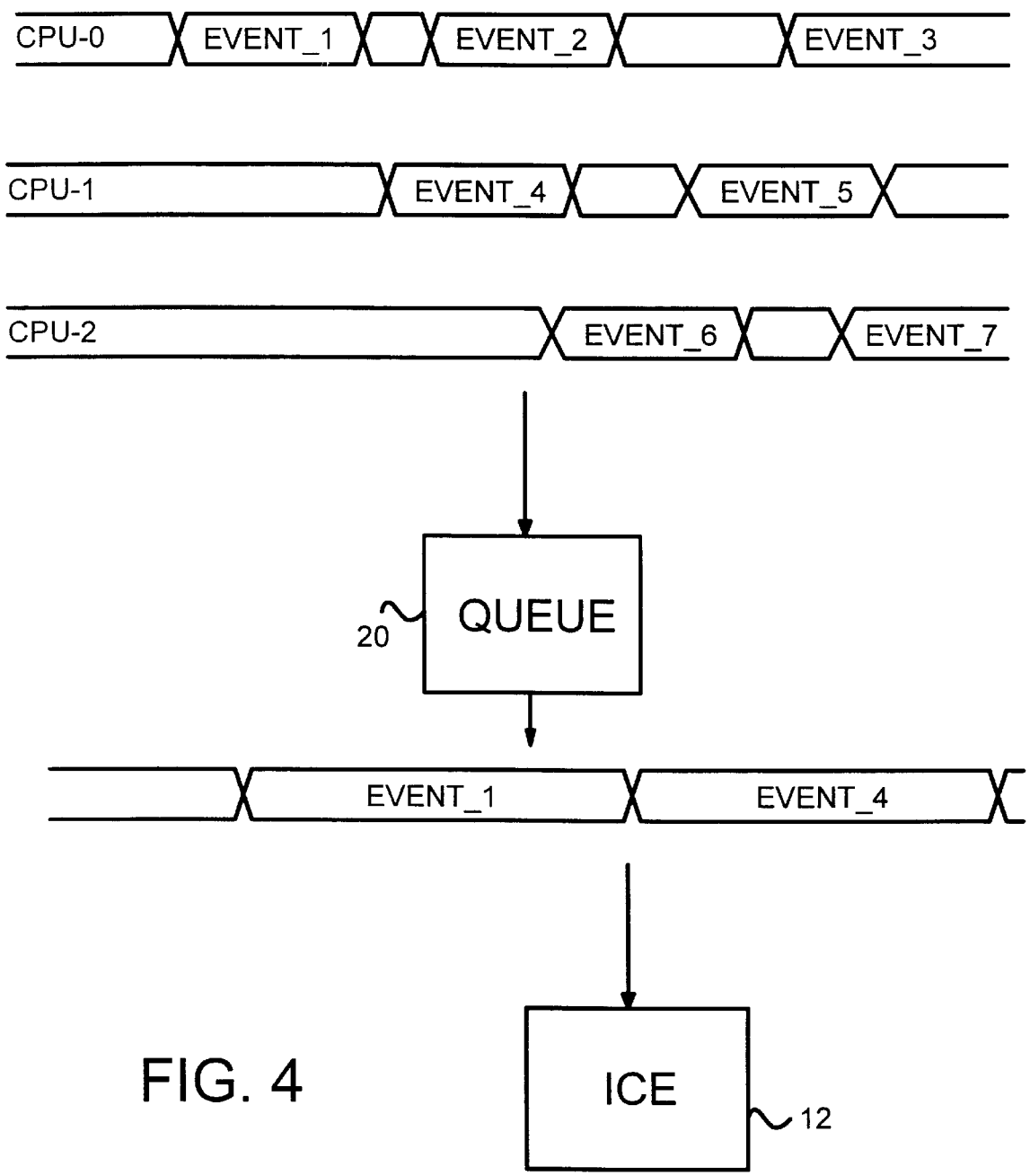
FIG. 4 is a timing diagram of a multi-processor chip with a debug queue which transmits trace information to an external ICE at a slower rate.

FIG. 4 is a timing diagram of a multi-processor chip with a debug queue which transmits trace information to an external ICE at a slower rate. Debug trace information is generated at the high clock rate of the processor cores, as indicated by the short time period of EVENT_1 . . . EVENT_7 generated by the processor cores. These trace events are stored in debug queue 20 and then sent to external ICE 12 over external bus 14. ICE 12 receives these trace events at a slower rate of the memory-bus clock as indicated by the longer time periods of EVENT_1 and EVENT_4, the first two trace events received by queue 20.

Format of Trace Records in Debug Queue

FIG. 5 is a diagram of trace records stored in the debug queue. When a trigger is detected in a CPU core, such as by address comparison to a trigger address in a debug register, trace information is sent to debug queue 20. Three formats are defined for storing the trace information in the debug queue. The three formats differ in size: a 16-bit format, a 32-bit format, and a 64-bit format. The larger-sized formats can store more information about the debug event. The 64-bit format stores 32 bits of data, while the 32-bit format does not store the data. The 16-bit format does not store the data nor the address, while the 32-bit format stores 16 bits of the address.

All three formats store the cause of the event and a time stamp. The cause field identifies which of the four debug trigger registers and which CPU core or other sub-system on the chip caused the event. A six-bit field is used for the cause field:

| | |
|---|---|
| 000000 | Empty, no trace record |
| 001REQ | Trace caused by debug register 1, from requestor REQ |
| 010REQ | Trace caused by debug register 2, from requestor REQ |
| 011REQ | Trace caused by debug register 3, from requestor REQ |
| 100REQ | Trace caused by debug register 4, from requestor REQ |

The source of the record, in requester field REQ, is encoded as:

| | |
|---|---|
| 000 | CPU core 0 |
| 001 | CPU core 1 |
| 010 | CPU core 2 |
| 100 | Cache subsystem |
| 101 | Bus Interface Unit to External DRAM |
| 110 | System interface |
| 111 | Diagnostic unit |

The cache may generate a debug event independently of any CPU core. An external snoop request to the shared cache could match a trigger address. If more than one source generates the same trigger at the same time, then the REQ field of the cause is set for the lowest requester.

Time Stamp Field Stored in Debug Queue on Chip

The time stamp allows the ICE to place the buffered event into the order the events occurred, even when the events are generated by different processor cores. A time-stamp register is used by all CPU cores and sub-systems to load the time-stamp field into the debug queue. Thus a single time base is used for all processor cores, allowing comparison of processor activity of different CPU cores. The time stamp indicates how far apart different events are.

The time-stamp register is a 10-bit register which increments every N cycles of the processor clock. A second register holds the value for N, the clock divisor, while a third register controls the operation of the time-stamp register.

The time-stamp register is not a real-time clock requiring many bits. Ten bits provides cycle-level granularity for events occurring within 1024 processor clock cycles of each other. For events which are farther apart than 1024 cycles, the clock divisor can be programmed to a value larger than 1 so that longer periods of time can be measured by the time stamp. For example, a clock divisor of 16 indicates that an event occurred within a 16-cycle window, and can distinguish events 16,384 cycles apart.

The time-stamp divisor is a 16-bit value, allowing the time-stamp register to be incremented as slowly as once every 65,535 clock cycles. Programming the time-stamp divisor to zero invokes a special mode where the time stamp is no longer periodically incremented. Instead the time-stamp register is incremented only when a trace event is triggered. When two or more events occur in a single clock period, the time-stamp register is only incremented once for the cycle. This mode is useful for identifying when two events occur in the same clock cycle, without indicating the time of each event.

The time-stamp control register contains four bits:
1. Saturate/Roll over Counter
2. Reset time-stamp counter after each trace record generated 3. Generate time-stamp roll-over trace record 4. Queue overflow trace record generate enable.

When the first bit is cleared the 10-bit time-stamp register rolls over to zero when the maximum count is reached. Setting the first bit causes the counter to saturate or stop counting/incrementing once the maximum count (0×3FF hex) is reached.

Setting the second control bit causes the time-stamp counter to reset to zero after each event is triggered. In this mode the time stamp represents the difference (delta) in time between trace records.

Setting the third control bit causes a special roll-over trace record to be generated each time the time-stamp counter rolls over to zero. This special roll-over trace record is written to the top of the debug queue once every time it rolls over and can be used by the external ICE to generate an exact time of each event triggered, even when the events are separate by more than 1024 cycles (or multiples of the clock divisor). Of course, the counter must be set to roll over by clearing the first control bit.

Queue Overflow Record

Other formats for the trace records may be defined, and the order and type of fields in a trace record may be changed for different record formats. For example, a queue-overflow record may be generated when the debug queue overflows. This queue-overflow record is inserted to the top of the queue and eventually read out to the external ICE.

Debug Trigger Registers

FIG. 6 is a diagram of a debug trigger register for a multi-processor chip. Four debug registers 42 are shared among all three processor cores for triggering debug events. Address field 80 is programmed with a 32-bit address which is compared with addresses generated by the three processor cores. An address match is required for many types of debug events, but not for all types of events. For example, an interrupt may trigger a debug event although no address is compared.

Mask field 82 is a 5-bit field which is programmed with a binary number. The binary number indicates the number of least-significant address bits to ignore or mask off in the address comparison to the trigger address in address field 80. When mask field 82 is programmed with the value 00101, then the lowest five address bits are ignored; any address within an aligned 32-byte block is considered an address match. Thus mask field 82 allows for coarse granularity of address comparisons.

Type field 84 is programmed with a code indicating the type of transaction to trigger on. For example, the debug register can be programmed to trigger on a write to a certain address but not trigger on a read to that same address. Code or Data accesses can be selected, as can accesses to diagnostic or memory spaces. Table 1 lists the types of transactions and their respective codes for type field 84. These codes may be combined when a don't care ("x") is present in the codes.

TABLE 1

Trigger Types

| Code | Type | Requires Address Match ? |
|---|---|---|
| 00xx0 | Read Access | Yes |
| 00xx1 | Write Access | Yes |
| 00x0x | Code-Space Access | Yes |
| 00x1x | Data-Space Access | Yes |
| 000xx | Memory-Space Access | Yes |

TABLE 1-continued

Trigger Types

| Code | Type | Requires Address Match ? |
|---|---|---|
| 001xx | Diagnostic-Space Access | Yes |
| 01xxx | Reserved/Undefined | No |
| 10eee | Event From CPU | No |
| 11000 | Debug Queue Full | No |
| 11001 | External Interrupt | No |
| 11010 | External Error | No |
| 111ii | System Interrupt | No |

Setting type field 84 to 11000 causes a debug trigger when the debug queue is full or nears full. This inserts a "queue near full" record into the debug queue which can be detected by the external ICE once the record is read out of the chip.

For system interrupts, the interrupt number "i i" is encoded into the last two bits of type field 84. For CPU events, the CPU event is encoded into the last three bits of type field 84 designated "eee". Table 2 lists the types of CPU events. Event counters can be programmed to count cache accesses, snoops, pipeline stalls, and branch prediction results. These event counters can overflow when more than $2^{32}$ events of that type have occurred. Instruction and data address strobes when an address or data match occurs.

TABLE 2

CPU Event Types

| Code | CPU Event Selected |
|---|---|
| 000 | Event Counter 0 |
| 001 | Event Counter 1 |
| 010 | Event Counter 2 |
| 011 | Instruction Address Strobe |
| 100 | Event Counter 0 Overflow |
| 101 | Event Counter 1 Overflow |
| 110 | Event Counter 2 Overflow |
| 111 | Data Access Strobe |

External interrupts and errors can also trigger debug events when type field 84 is set to 11001 or 11010. These event types do not require an address match since an address is not generated.

CPU identifier field 86 is an 8-bit field which indicates which processor core or sub-system is the debug event programmed for. Each of the four debug registers 42 can be programmed to trigger on addresses or events from any of the processor cores. Any of the debug registers 42 can be programmed to trigger on an event from any of the processor cores, or just some of the cores. Table 3 shows the encoding for CPU identifier field 86, where "x" is a don't care bit.

TABLE 3

CPU Identifier Field

| Encoding | Trigger from |
|---|---|
| 1xxxxxxx | CPU core 0 |
| x1xxxxxx | CPU core 1 |
| xx1xxxxx | CPU core 2 |
| xxx1xxxx | Reserved |
| xxxx1xxx | Level-2 Cache |
| xxxxx1xx | DRAM BIU |
| xxxxxx1x | System Interface |
| xxxxxxx1 | Reserved |

An encoding of 11100000 triggers on a match from any of the three processor cores. An encoding of 11101110 triggers when the match or event is from any of the three processor cores or from the shared cache or system or DRAM interfaces. Thus CPU identifier field 86 can be used to trigger a debug event for writing to a specific address location by any processor core or sub-system. An encoding of 10100000 triggers only for an event generated by the first or third processor cores. CPU identifier field 86 thus allows for great flexibility in programming debug events. A code of 00000000 disables the trigger register.

Action field 88 indicates what action is taken when a debug event is triggered. A common action taken is to add a trace record to the debug queue. Other actions include stopping the processor clock to one or more of the processor cores, and sending an interrupt to a specific processor. Table 4 lists the actions encoded by action field 88.

TABLE 4

| Action Field | |
|---|---|
| Encoding | Action Taken |
| 00000 | No Action |
| 0kkk0 | Stop clock to CPUs kkk |
| 100cc | Send Interrupt to CPU cc |
| 11ttt | Add Trace Record of Type ttt |

Clocks may be stopped to one or more processor cores by programming a one-hot encoding of the CPU's as "kkk". For example, encoding 01000 stops the clock for the first processor core but no others. Encoding 00110 stops the clock for the second and third processor cores but not the first core, while encoding 01110 stops the clock to all three processor cores when the event is triggered. Field "cc" is 00 for CPU 0, 01 for CPU 1, or 10 for CPU 2.

An interrupt is sent to only one processor core, so a binary encoding "cc" is used to identify which processor core receives the interrupt. Encoding action field 88 with 10001 sends the interrupt to the first processor core while 10010 sends the interrupt to the second processor core and 10011 sends the interrupt to the third processor core.

When the action specified is to add a trace record to the debug queue, the size and type of the trace record added is encoded as record type "t t t". Table 5 lists the possible trace record types. FIG. 5 showed the trace record formats for 16-, 32-, and 64-bit record types. The time stamp rollover or queue overflow record types cannot be selected as they are automatically generated when the time stamp register rolls over and the third control bit for the time stamp counter is set. The queue overflow record is generated independently of the debug events when the queue overflows.

TABLE 5

| Trace Record Types | |
|---|---|
| Code ttt | Trace Record Type |
| 000 | 16-bit (No address, no data) |
| 001 | 32-bit (Address, no data) |
| 100 | 64-bit, data word 0 |
| 101 | 64-bit, data word 1 |
| 110 | 64-bit, data word 2 |
| 111 | 64-bit, data word 3 |
| 011 | Queue Overflow |
| 010 | Time Stamp Rollover |

In the preferred embodiment, accesses are 128-bit data bursts, and thus separate trace record types are defined for each of the four 32-bit words of the burst.

Figure 7:
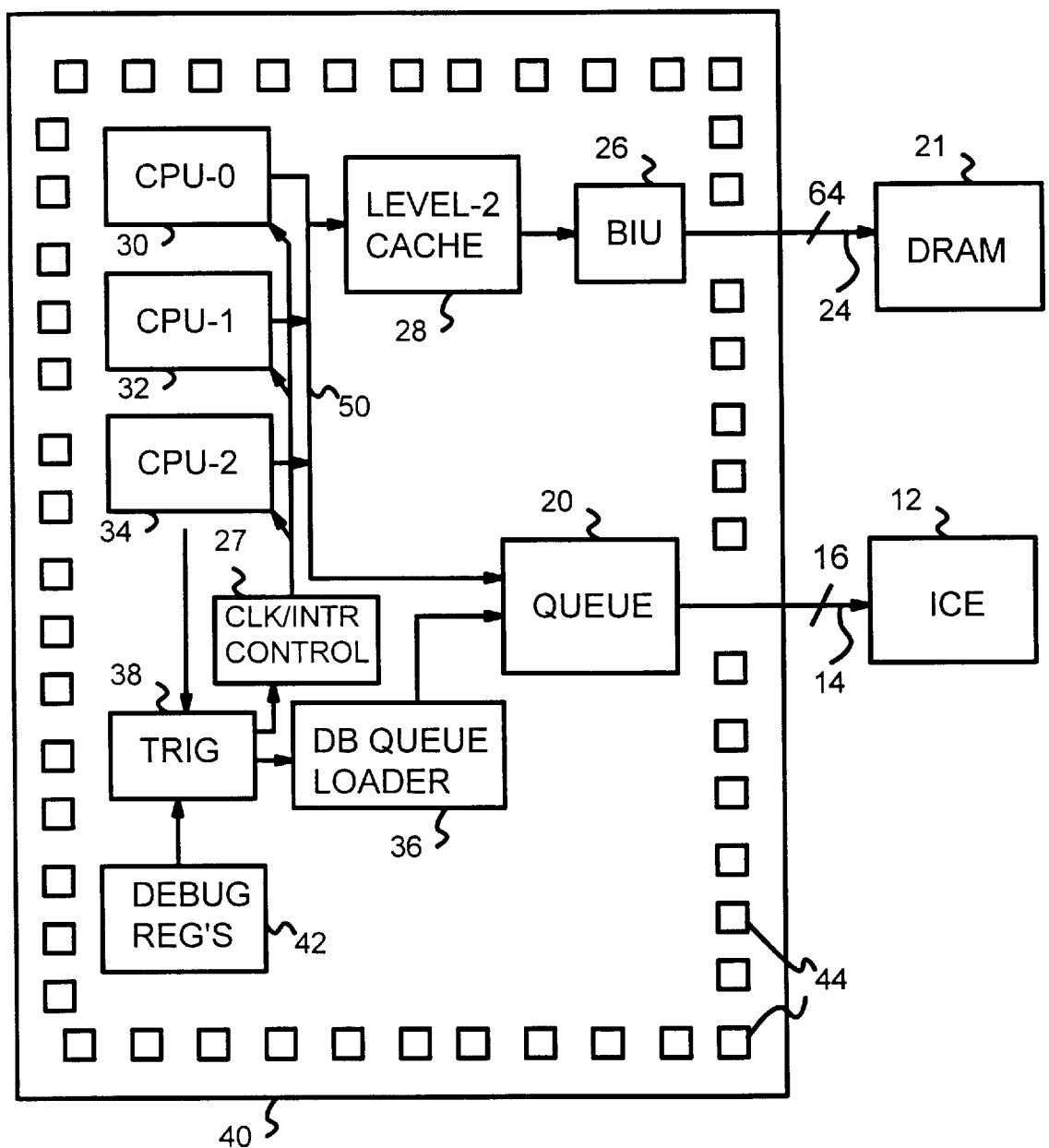
FIG. 7 is a diagram of a multi-processor chip with a debug queue.

Multi-Processor Chip with Debug Queue—FIG. 7

FIG. 7 is a diagram of a multi-processor chip with a debug queue. Multi-processor die 40 contains three processor cores for executing independent general-purpose programs. CPU cores 30, 32, 34 each contain one or more pipelines for fetching and executing instructions. CPU cores 30, 32, 34 each contain an execution unit and one or two primary caches.

CPU cores 30, 32, 34 request instructions and data operands from second-level cache 28, which is preferably a large write-back cache. Misses in second-level cache 28 are sent to external DRAM 21. Bus-interface unit (BIU) 26 generates bus cycles on external memory bus 24, which is a 64-bit or 128-bit data bus.

Internal bus 50 sends requests from CPU cores 30, 32, 34 to second-level cache 28. Separate busses from each CPU core can be used, but the shared internal bus 50 is less expensive. Each CPU core 30, 32, 34 has its own primary cache.

Internal bus 50 also connects to debug queue 20 to supply address, data, and status information from CPU cores 30, 32, 34 or second-level cache 28. The address, data, and status information is used to assemble the trace record loaded into debug queue 20 when a debug event is triggered and the action specified in action field 88 is to load a trace record into the debug queue.

Trigger detector 38 compares addresses and cycle status information from CPU cores 30, 32, 34 and second-level cache 28 to the trigger addresses and conditions programmed into debug registers 42. In a preferred embodiment, four debug registers are provided for all CPU cores and sub-systems on multi-processor die 40. When a debug event is detected by trigger detector 38, then debug queue loader 36 assembles the address, data, and status from internal bus 50 and creates a trace record of the type specified by action field 88 of debug registers 42. When the action specified does not load a trace record into debug queue 20, then debug queue loader 36 sends a stop clock command or an interrupt to the appropriate CPU core 30, 32, 34 from clock and interrupt control logic 27.

Trace records loaded into debug queue 20 are read out to external ICE 12. External ICE bus 14 includes some of I/O pins 44 on multi-processor die 40 so that the trace records written to debug queue 20 are transmitted off-chip to external ICE 12. Since I/O pins 44 are a limited resource, and adding more I/O pins significantly increases the cost of multi-processor die 40, external ICE bus 14 is limited to 16 data bits, or two bytes. This is a very small amount of debug trace information, being only half of a 32-bit trace record, the smallest record format containing an address. The small size of external ICE bus 14 is unsatisfactory if debug information is not stored in debug queue 20 and had to be transferred off-chip immediately.

Advantages of Debug Queue and Separate Debug Bus

Debug queue 20 allows debug trace information to be rapidly generated within die 40 and then sent off-chip at a more leisurely pace on a low-bandwidth external bus. Cost is reduced as few I/O pins are needed for transferring debug information off the die to the external ICE. The primary interface to the external DRAM 21 is not used for trace information, so debug operation does not reduce the bandwidth available for fetching operands and instructions. Using external memory bus 24 for transmitting debug trace information to ICE 12 would require some of the bandwidth that is otherwise used for program execution. Thus the programs being debugged are not slowed down due to a lack of bandwidth on the external memory bus. This provides more realistic program execution when debugging is performed since a dedicated bus is available for off-loading debug trace records.

Performance and Programming Considerations

In a preferred embodiment, the debug queue contains 128 bytes of storage. Up to 64 16-bit records, or 32 32-bit records, or 16 64-bit records, or any combination of no more than 128 bytes may be contained in the debug queue at any time. The debug queue transmits two bytes of trace information each cycle of a clock. The internal processor clock operates at triple the external bus frequency. When 16-bit trace records are generated each processor clock cycle, then the debug queue fills up after 64 processor clocks, or 32 clocks when two processor cores are each generating trace records simultaneously and the queue is not being emptied.

Normally the queue is being emptied by transferring two bytes of trace record to the ICE each external clock period. For every three processor clock periods, two bytes are read out of the debug queue but at least six bytes are written in by one processor core. The net is four more bytes for every three processor clocks. If the trace records continue to be generated at this rate, the queue fills in 128/4 or 32 processor clocks. Thus a burst of no more than 32 records can be added to the queue by any one trigger event.

This is still a significant burst of trace information, over 32 clock periods, for such a small queue. Larger queue sizes could be used to support capture of larger bursts. It is important that the average generation of trace records be less than the external transfer rate of two bytes per 150 MHz clock period. Since debug events are normally quite rare, it is unlikely that the average over a long period of time exceeds the external transfer rate.

The user or program debugger can interactively adjust the trace generation rate. When the debug queue overflows from too many trace records being generated, a special queue-overflow record may be inserted into the debug queue. When a queue overflow record is generated and detected upon being read out to the external ICE, the programmer can reduce the trace frequency by using a 16-bit record rather than a 32- or 64-bit record, or by reducing the number of trigger addresses or adjusting the event counters. The CPU's clock could also be slowed down relative to the external clock.

Figure 8:
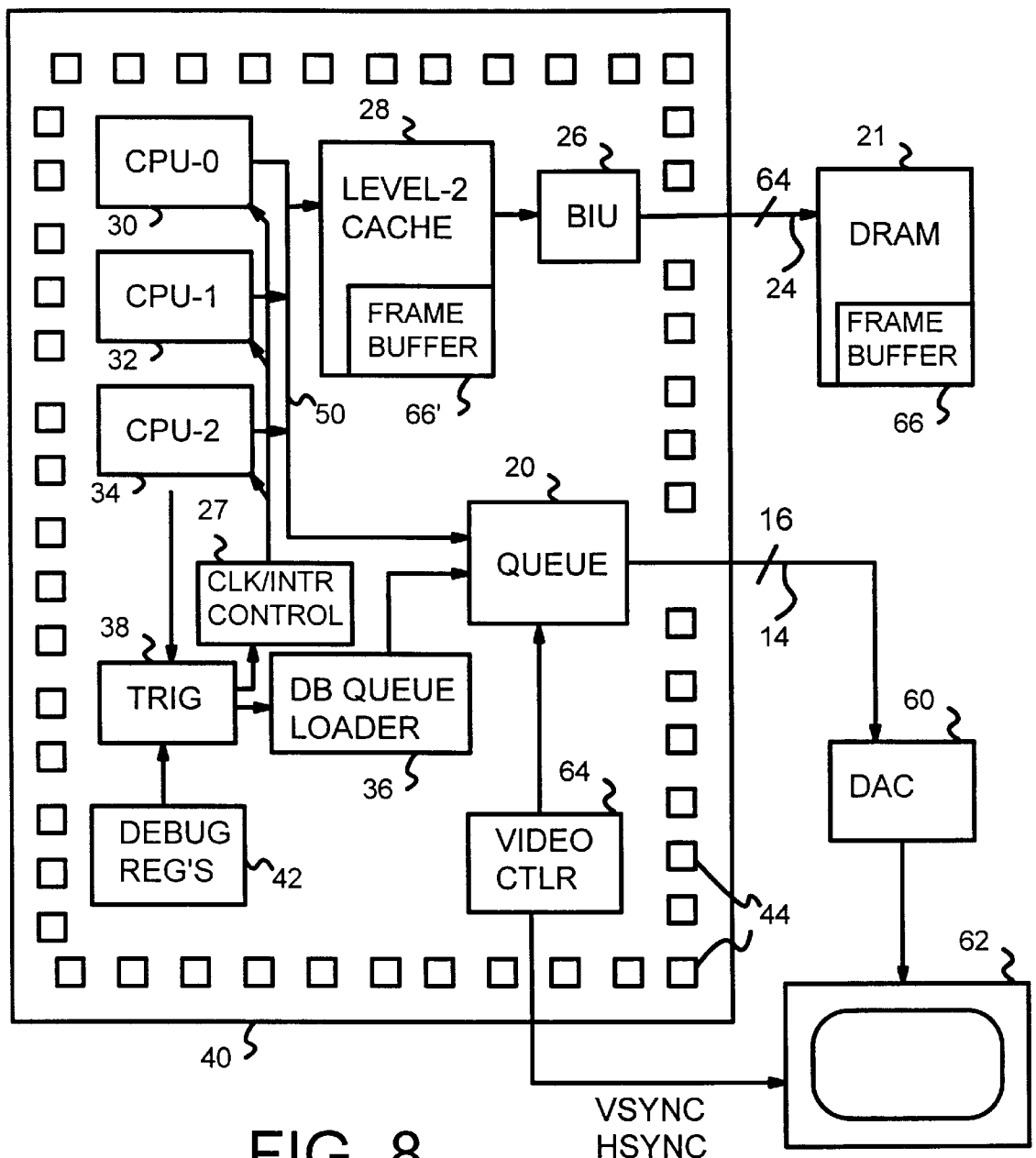
FIG. 8 is a diagram of a multi-processor die with a debug queue which is also used for buffering video pixels.

Debug Queue Used for Video FIFO—FIG. 8

FIG. 8 is a diagram of a multi-processor die with a debug queue which is also used for buffering video pixels. The components of FIG. 8 operate in a manner similar to that described for FIG. 7. External DRAM 21 includes a portion used as frame buffer 66, which contains pixel data for display on monitor 62. Many formats and encodings of pixels are possible, and a common format uses two bytes for a full-color red-green-blue (RGB) pixel.

Video controller 64 is located on multi-processor die 40. Video controller 64 includes timing circuits to generate horizontal and vertical synchronization signals HSYNC, VSYNC to monitor 62 to indicate when a new horizontal line or a new screen of horizontal lines are being written to monitor 62. HSYNC and VSYNC are derived from a graphics pixel clock which times the transfer of individual pixels in a horizontal line.

Video controller 64 includes counters to indicate which horizontal line and which pixel in the horizontal line is being transferred. Video controller 64 is pipelined so that pixels are fetched ahead of their being transferred to monitor 62. Rather than fetch pixels directly from frame buffer 66 in external DRAM 21, video controller 64 first requests the pixels from level-two cache 28. Since level-two cache 28 is a write-back cache, sometimes new pixels are written by CPU cores 30, 32, 34 to level-two cache 28 but the new pixels have not been written back to external DRAM 21. This commonly occurs when a new image is being written, or a portion of the display is being updated.

A local frame buffer portion 66' of frame buffer 66 in external DRAM 21 is present in second-level cache 28. Pixels requested by video controller 64 which are not in local frame buffer portion 66' are misses to second-level cache 28 and are fetched from external DRAM 21 by BIU 26. Since pixel fetching is deeply pipelined, larger blocks of pixels can be fetched from DRAM 21 using burst cycles. This improves efficiency of external DRAM bus 24.

Pixels requested from second-level cache 28 are transferred over internal bus 50 to debug queue 20. Since debug mode is disabled when internal video controller 64 is enabled, debug queue 20 is used as the video FIFO. Pixels loaded into debug queue 20 are transferred off die 40 using I/O pins 44 on external ICE bus 14. Since external ICE bus 14 is 16 bits wide, a standard two-byte pixel is transferred to digital-to-analog converter (DAC) 60 each pixel clock cycle. DAC 60 converts the 16-bit pixel from digital format to analog voltages representing the intensity of the red, green, and blue components of the pixel, and these analog voltages are sent to monitor 62. A RAM look-up table may be used with the DAC to change attributes or re-map the color space.

When debugging is performed, debug queue 20 is used for debug trace records and video controller 64 is disabled. An external video card is used to generate display information. Since debug is seldom used by end users, end-user systems can use the debug queue for video functionality, reducing system cost.

Advantages of Combined Video & Debug Queue

Cost and complexity are reduced by using the same hardware buffer for two purposes: video pixel buffering and debug trace buffering. Both uses provide a stream of data to external devices: either the video pixels to an external DAC and monitor, or debug trace records to an external ICE.

Placing a cached portion of the frame buffer in DRAM allows several frame buffers to exist as the DRAM size is large. Specialty RAMs such as VRAMs are not needed, reducing cost. The processors have instant access to the cached copy of the frame buffer as it is located on-chip in the shared second-level cache. The cached frame buffer does not have to be flushed when the screen is updated, and the cached frame buffer does not have to be write-through since the video controller accesses the second-level cache on-chip before accessing the frame buffer in the external DRAM. Making the cache and the frame buffer write-back rather than write-through increases performance, especially when frequent screen updates are performed, since all updates do not have to be immediately written out to DRAM. Newly written pixels can be accumulated until a large block of pixels can be burst out to the DRAM. Bursts of 32 bytes (16 pixels) are much more efficient than single-pixel (2-byte) writes to DRAM. Frequent updates overwrite earlier updates and the earlier update no longer must be written back to DRAM, thus decreasing traffic. Writes can be accumulated and written in larger blocks, which improves efficiency of the DRAM interface.

Rather than use extra pins for a data path to the external frame buffer, the invention uses the existing DRAM path to access the frame buffer in the DRAM. Cost is reduced since additional pins are not needed for a dedicated data path to the frame buffer.

Alternate Embodiments

Several other embodiments are contemplated by the inventors. For example the RAMDAC may be integrated onto the microprocessor chip so that the analog RGB signals are transmitted off chip directly to the monitor. A flat-panel display or other display technologies may be substituted with some modifications. The width of the busses may be varied, and in particular a 4-byte pixel and external ICE bus is contemplated by the inventors.

Many variations of the video and debug logic are possible. Separate internal busses may be used for the different CPU cores, or a shared bus may be used as described. Separate debug registers could be provided for each CPU core, and the triggering logic and address comparators may be located near or in the CPU cores. More than one debug queue could be used, and the size of the queue can be varied.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A microprocessor die adapted for high-speed debugging comprising:

I/O pins on the die for making electrical connections between circuitry on the microprocessor die and external circuitry, the I/O pins including memory interface pins for connection to an external memory and debug interface pins for connection to an external in-circuit emulator (ICE);

a processor core for fetching and executing instructions;

a cache, coupled to the processor core, for supplying instructions and operands to the processor core;

a bus-interface unit, coupled to the cache and to the memory interface pins, for accessing the external memory when an instruction or an operand requested by the processor core is not present in the cache;

a debug queue, coupled to the processor core, for storing debug trace records generated by execution of traced instructions by the processor core; and a debug interface, coupled to the debug queue and to the debug interface pins on the microprocessor die, for transferring debug trace records previously written to the debug queue to the external ICE, the external ICE for displaying the debug trace records;

wherein the debug interface pins are different pins than the memory interface pins, the debug interface being a separate interface from the memory interface, whereby the debug queue buffers debug trace records to the external ICE using the debug interface pins and whereby bandwidth of the memory interface pins is not used for transferring debug trace records, allowing high-speed debugging.

2. The microprocessor die of claim 1 wherein the debug queue comprises a FIFO memory including:

writing means for writing the debug trace records to the debug queue at a first rate of a processor clock; and reading means for reading the debug trace records stored in the debug queue to the debug interface pins at a second rate of an external clock, wherein the second rate of the external clock is a lower rate than the first rate of the processor clock.

3. The microprocessor die of claim 2 wherein the reading means reads a debug trace record which was written to the debug queue at least N cycles of the external clock before, the debug queue containing N debug trace records, whereby transfer of debug trace records to the external ICE is delayed by several external clock cycles when the debug queue contains other debug trace records.

4. The microprocessor die of claim 1 wherein the debug trace records stored in the debug queue include:

a time-stamp field for indicating a temporal location of when the debug trace record was generated by the processor core;

an identifier field for indicating a debug event which caused the debug trace record to be generated, whereby the time-stamp field in the debug trace record is stored in the debug queue and transferred to the external ICE to indicate when the debug trace record was generated by the processor core.

5. The microprocessor die of claim 4 further comprising:

a time-stamp counter having a limited modulus, the time-stamp counter reaching the limited modulus in less than a minute when each pulse of a processor clock for clocking the processor core increments the time-stamp counter;

wherein the time-stamp field for a first debug trace record is capable of containing a same numerical value as a second debug trace record when the time-stamp counter reaches the limited modulus between the first debug trace record and the second debug trace record, whereby the debug trace records include a time stamp generated from a limited-modulus counter.

6. The microprocessor die of claim 5 further comprising:

rollover means, coupled to the time-stamp counter, for writing a rollover trace record to the debug queue when the time-stamp counter reaches the limited modulus; and reset means, coupled to the rollover means, for resetting the time-stamp counter when the time-stamp counter reaches the limited modulus, whereby the rollover trace record in the debug queue separates the first debug trace record from the second debug trace record when the time-stamp counter reaches the limited modulus between the first debug trace record and the second debug trace record.

7. The microprocessor die of claim 5 further comprising:

divisor means, coupled to the time-stamp counter, for incrementing the time-stamp counter after every X pulses of the processor clock, where X is a clock divisor programmed into a clock divisor register, whereby the time-stamp counter is incremented at a programmable rate.

8. The microprocessor die of claim 5 further comprising:

clearing means, coupled to the time-stamp counter, for clearing the time-stamp counter after each debug trace record is written to the debug queue, wherein the time-stamp field indicates an amount of time since the previous debug trace record was written to the debug queue when the clearing means is activated.

9. The microprocessor die of claim 1 further comprising:

a second processor core for fetching and executing general-purpose instructions, the second processor core coupled to the cache and coupled to the debug queue;

the debug queue further coupled to the second processor core, for storing debug trace records generated by execution of traced instructions by the processor core and by the second processor core;

wherein the processor core and the second processor core are not directly connected to address and data I/O pins on the microprocessor die, the processor core and the second processor core indirectly accessing the external memory through the cache and the bus-interface unit, whereby multi-processor debugging is accomplished by the debug queue buffering debug trace records generated from both the processor core and the second processor core.

10. The microprocessor die of claim 9 wherein the processor core and the second processor core execute independent programs.

11. The microprocessor die of claim 10 wherein the traced instructions are instructions which access a traced memory location, the traced memory location having a trigger address stored in a debug register, the microprocessor die further comprising:

trigger compare means, coupled to the processor core and coupled to the second processor core for comparing memory addresses generated by the processor core and the second processor core to the trigger address stored in the debug register, the trigger compare means signaling a debug event when a match is detected.

12. The microprocessor die of claim 1 further comprising:

a video controller for generating a horizontal synch signal and a vertical synch signal to an external display, the horizontal synch signal indicating when a new horizontal line of pixels is being sent to the external display, the vertical synch signal indicating when a new screen of horizontal lines is being sent to the external display;

pixel fetch means, in the video controller, for requesting pixels for display by the external display, the pixel fetch means requesting the pixels from the cache;

pixel transfer means, coupled to the pixel fetch means, for transferring the pixels from the cache to the debug queue, whereby the debug queue stores the pixels for display.

13. The microprocessor die of claim 12 wherein the cache includes a frame buffer portion for storing a subset of the pixels in a screen of horizontal lines, the external memory storing a full frame buffer containing all of the pixels in the screen of horizontal lines, wherein the pixel transfer means retrieves pixels from the frame buffer portion of the cache but retrieves pixels from the external memory only when the pixels are not present in the frame buffer portion of the cache, whereby the frame buffer is cached.

14. The microprocessor die of claim 12 wherein the cache is a write-back cache, the cache containing updated pixels recently written by the processor core but not yet written back to the frame buffer in the external memory, the video controller first requesting pixels from the cache, the video controller requesting pixels from the frame buffer in the external memory when the pixels are not present in the cache, whereby the frame buffer is cached by a write-back cache wherein updated pixels are not immediately written through to the frame buffer in external memory.

15. A microprocessor comprising:

a central processing unit (CPU) for executing instructions;

a cache for storing instructions, operands, and pixels for display, the cache operating in a write-back mode whereby an operand or a pixel written by the CPU is not written back to an external memory until an entire cache line containing the operand or the pixel is written back to the external memory;

a debug register for storing a trigger address of a debug event;

a debug comparator, coupled to the debug register and coupled to the CPU, for comparing the trigger address from the debug register to an address generated by execution of instructions by the CPU, the debug comparator signaling a debug event when a match occurs;

a trace record loader, coupled to the CPU, for generating a trace record when the debug event is triggered, the trace record including an identifier for the trigger address and a time stamp for indicating a relative time that the debug event occurred;

a FIFO buffer, coupled to the trace record loader, for storing the trace record for later transmission to an external in-circuit emulator (ICE); and a video controller for transferring pixels from the cache to the FIFO buffer, the FIFO buffer transmitting the pixels to an external display when the external ICE is not connected to the microprocessor, whereby the FIFO buffer stores trace records when debugging and pixels when not debugging.

16. The microprocessor of claim 15 further comprising:

a video-ICE interface, coupled to the FIFO buffer but not coupled to the cache, for transferring a stream of pixels from the FIFO buffer to the external display monitor when debug mode is disabled, but transferring trace records to the external ICE when debug mode is enabled;

a memory interface, coupled to the cache, for accessing an external DRAM memory when a request for an instruction, operand, or pixel misses in the cache, wherein the video-ICE interface is separate from the memory interface so that trace records are not transferred over the memory interface, allowing the memory interface to operate at a full operating speed during debug mode.

17. The microprocessor of claim 16 wherein the CPU comprises a plurality of independent processor cores, each processor core for executing instructions from a general-purpose instruction set independently of execution by other processor cores, whereby debug events are generated from multiple processor cores executing independent programs.

18. A method for tracing execution of a program of instructions on a processor chip comprising the steps of:

executing a stream of instructions on a processor core and generating an address;

comparing the address generated by the processor core to a trigger address and trigger conditions and signaling a debug event when a match occurs;

reading an action field in a debug register containing the trigger address when the debug event is signaled and performing an action indicated by the action field;

when the action in the action field is a trace-address action:

generating a trace record including the address generated by the processor core and loading the trace record into a debug queue;

when the action in the action field is a trace-address-data action:
  generating a trace record including the address generated by the processor core and data generated by the processor core and loading the trace record into a debug queue;

when one or more trace records are present in the debug queue:
  reading an oldest trace record out of the debug queue and outputting the oldest trace record to debug interface pins on the processor chip when a trace record is present on the debug interface pins:
  transferring the trace record to an external in-circuit emulator (ICE) and displaying the trace record to a debugging user, whereby trace records are generated and loaded into the debug queue before being transferred to the external ICE.

19. The method of claim 18 further comprising the steps of:
  when the action in the action field is a trace-address-data action or a trace-address action:
    reading a time-stamp counter and writing a time-stamp value of the time-stamp counter to the trace record generated
  whereby the trace record includes the time-stamp value to indicate when the debug event occurred.

20. The method of claim 18 further comprising the steps of:
  when the action in the action field is a stop-clock action:
    stopping a processor clock to the processor core and halting execution of instructions;
  when the action in the action field is a send interrupt action:
    generating an interrupt to the processor core;
  whereby the debug event generates a trace record, generates the interrupt or stops the processor clock.

* * * * *